(12) United States Patent
Chen

(10) Patent No.: US 7,882,242 B2
(45) Date of Patent: Feb. 1, 2011

(54) METHOD FOR TRANSMITTING DESTINATION USER PART UNAVAILABLE MESSAGE

(75) Inventor: Guohuo Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 131 days.

(21) Appl. No.: 12/110,683

(22) Filed: Apr. 28, 2008

(65) Prior Publication Data

US 2008/0201427 A1 Aug. 21, 2008

Related U.S. Application Data

(63) Continuation of application No. PCT/CN2006/001762, filed on Jul. 19, 2006.

(30) Foreign Application Priority Data

Oct. 26, 2005 (CN) .......... 2005 1 0100840

(51) Int. Cl.
G06F 15/16 (2006.01)
(52) U.S. Cl. .......... 709/227; 709/249; 370/236; 370/476
(58) Field of Classification Search .......... 709/227
See application file for complete search history.

(56) References Cited

U.S. PATENT DOCUMENTS

| | | | |
|---|---|---|---|
| 3,685,051 A * | 8/1972 | Wells | 342/179 |
| 6,920,144 B2 | 7/2005 | Niermann | |
| 2001/0033549 A1 * | 10/2001 | Yi | 370/236 |
| 2003/0061391 A1 * | 3/2003 | Yi | 709/249 |
| 2004/0052247 A1 * | 3/2004 | Stahl et al. | 370/352 |
| 2004/0068534 A1 | 4/2004 | Angermayr et al. | |
| 2004/0184594 A1 * | 9/2004 | Schmechel et al. | 379/229 |
| 2008/0063008 A1 * | 3/2008 | Lei et al. | 370/467 |
| 2008/0192914 A1 * | 8/2008 | Lin et al. | 379/211.02 |
| 2009/0238205 A1 * | 9/2009 | Wang et al. | 370/467 |

FOREIGN PATENT DOCUMENTS

| | | |
|---|---|---|
| CN | 1463124 A | 12/2003 |
| CN | 1505901 A | 6/2004 |

OTHER PUBLICATIONS

International Search Report for International Application No. PCT/CN2006/001762, dated Nov. 16, 2006, and English Translation.
Bidulock, B., et al.; "M3UA SG-SG communication"; IETF Internet Draft <draft-bidas-sigtran-sgsg-00.txt>; May 2, 2002; XP015000260.
Morneault, K., et al.; "Signaling System 7 (SS7) Message Transfer Part 3 (MTP3)—User Adaptation Layer (M3UA)"; IETF Internet Draft <draft-ietf-sigtran-rfc3332bis-03.txt>; May 2005; XP015028972.
Supplementary European Search Report for European Application No. EP 06761497.4, dated Dec. 4, 2008.
Chinese Office Action for Chinese Patent Application No. 200510100840.6, dated Apr. 4, 2008, and English translation thereof.

* cited by examiner

*Primary Examiner*—Wing F Chan
*Assistant Examiner*—Tesfay Yohannes

(57) ABSTRACT

A method for transmitting Destination User Part Unavailable message includes: signaling-point-transmitting, by an Application Server Process, a received DUPU message, if the Application Server Process is a signaling transfer point.

5 Claims, 1 Drawing Sheet

METHOD FOR TRANSMITTING DESTINATION USER PART UNAVAILABLE MESSAGE

CROSS-REFERENCE TO RELATED APPLICATIONS

The present application is a continuation application of PCT application No. PCT/CN2006/001762, filed on Jul. 19, 2006, which claims the benefit of Chinese priority No. 200510100840.6, filed Oct. 26, 2005. The disclosures of these applications are incorporated by reference herein in their entirety.

FIELD

The present disclosure relates to the field of communications and to a method for transmitting a message.

BACKGROUND

The statements in this section merely provide background information related to the present disclosure and may not constitute prior art.

In current Message Transfer Part 3 User Adaptation Layer (M3UA) protocol, Destination User Part Unavailable (DUPU) message is used to notify Application Server Process (ASP) by Signalling Gateway Process (SGP) that the user part of remote peer Message Transfer Part level 3 (MTP3) in No. 7 signaling network node is unavailable. For more information on M3UA protocol, see RFC3332 "Signaling System 7 (SS7) Message Transfer Part 3 (MTP3)-User Adaptation Layer (M3UA)", which is incorporated herein by reference and further description is omitted.

When determining that the user part of No. 7 signaling destination, namely SPA, is unavailable, the MTP3 of SGP produces MTP-STATUS primitive. M3UA maps the primitive into DUPU message and sends the DUPU message to corresponding ASP as needed. After receiving the DUPU message, ASP acquires the Affected Destination Signaling Point Code (Affected Point Code) from the DUPU message and reports the upper layer user that the destination user part is unavailable.

The DUPU message is sent from SGP to ASP to indicate that the remote destination signaling point user part is unavailable.

The DUPU message carries the following information:

| Network Appearance | Optional |
|---|---|
| Routing Context | Optional |
| Affected Point Code | Mandatory |
| User/Cause | Mandatory |
| INFO String | Optional |

As illustrated in FIG. 1, ASP A and ASP B are provided with Signaling Transfer Point (STP) function and can transfer message from SGP A to SGP B; however ASP A, as an IP STP, may not transmit DUPU messages transparently.

1. When determining that the user part of a No. 7 signaling destination is unavailable, the MTP3 of SGP A produces a MTP-STATUS primitive. M3UA maps the primitive into DUPU message and sends the DUPU message to ASP A as needed. After receiving the message, ASP A acquires the corresponding Affected Point Code from the message and reports the upper layer user that the remote user part is unavailable.

2. Because DUPU message only notifies an adjacent signaling point that the user part of destination signaling point (the destination signaling point is a No. 7 signaling destination signaling point) is unavailable, ASP A only notifies the local upper layer user upon receiving DUPU message; whereas since ASP A immediately notifies local upper layer user that the user part is unavailable as a response to DUPU upon receiving the message, which makes ASP A unable to transmit the message to adjacent signaling point ASP B, so ASP B can not learn that the upper layer user of SP A is not available.

SUMMARY

The disclosure is directed to, in various aspects, a method for transmitting Destination User Part Unavailable message, so as to solve the problem that DUPU message can not be transmitted to a non-adjacent signaling point from Signaling Gateway Process.

A method for transmitting DUPU message is provided, and the method includes: signaling-point-transmitting, by an Application Server Process, a received DUPU message, if the Application Server Process is a signaling transfer point.

The method further includes: broadcasting, by the Application Server Process, the message to an adjacent signaling point.

The message includes information of a destination signaling point to be notified; and transmitting, by the Application Server Process, the message to a signaling point indicated by the information of the destination signaling point to be notified, upon receiving the message and determining that the information of the destination signaling point to be notified is contained in the message.

The information of the destination signaling point to be notified is contained in INFO parameter of the DUPU message.

Further, a message compatible with the DUPU message can be provided, and the message contains the information of the destination signaling point to be notified.

Moreover, parameter information including the information of the destination signaling point to be notified is provided in the message.

The present disclosure addresses, in various aspects, transparent transmission of destination user part unavailable message through M3UA IPSP, therefore enabling the destination user part unavailable message to be notified to the non-adjacent signaling point from SGP.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In order to make the purpose, technical solution and advantages clearer, please refer to the accompanying drawings and embodiments. It should be understood that the various embodiments described herein are only illustrative and do not define limitations.

In order to implement transparent transmission of DUPU message through IP STP, a field is added in M3UA DUPU message, such as the information of the destination signaling point to be notified by DUPU, to indicate that the destination signaling point is to be notified that the user part is unavailable.

As an example, adding the information of the destination signaling point into INFO parameter of DUPU message is described. New parameters including the information of the destination signaling point to be notified may be added into DUPU message:

Tag=0x00FE is added in INFO String parameter, denoting the Concerned DPC, namely the information of the destination signaling point to be notified. The detailed parameter structure is as follows:

| Tag = 0x0004 | Length |
|---|---|
| Tag = 0x00FE (Concern DPC) | Length = 4 * (N + 1) |
| Mask | Concerned DPC 0 |
| ... | ... |
| Mask | Concerned DPC |
| ... INFO String | |

Figure 1:
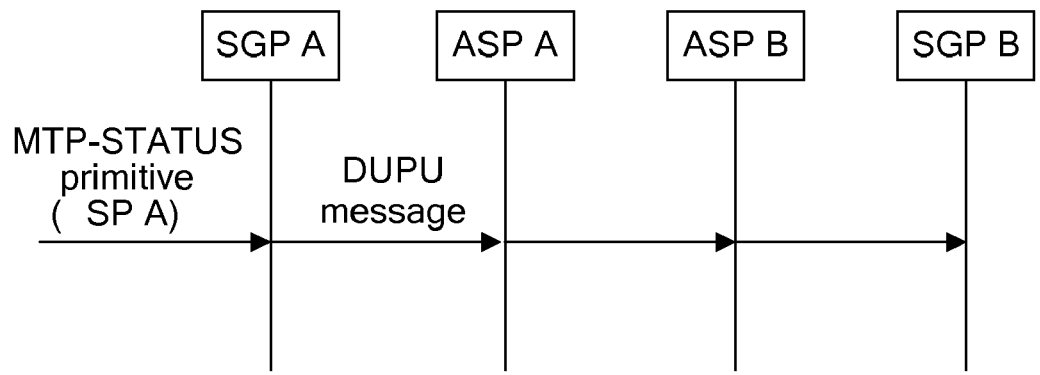
FIG. 1 is a block diagram of transmitting DUPU message in the prior art.
Figure 2:
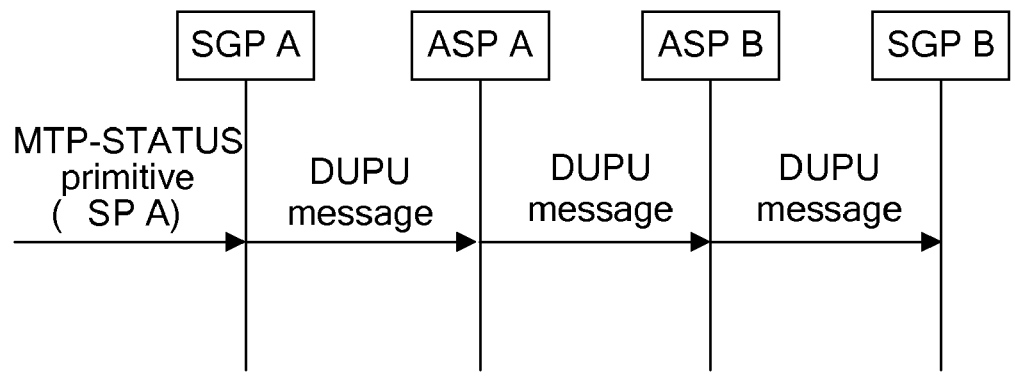
FIG. 2 is a block diagram of transmitting DUPU message.

As illustrated in FIG. 2, ASP A and ASP B are provided with STP function, and may transfer messages from SGP A to SGP B, and ASP A and ASP B may work in M3UA IP Server Process (IPSP) mode.

When detecting that the user part of a No. 7 signaling destination is unavailable, the MTP3 in SGP A produces an MTP-STATUS primitive. M3UA maps the primitive into DUPU message and sends the DUPU message to the corresponding ASP A as needed. After receiving DUPU message, ASP A acquires the corresponding Affected Point Code from the message and reports the upper layer user that the remote user part is unavailable.

If the local end is an STP, the processes may be performed by following:

1. If there is an optional parameter, Concerned DPC, in INFO String field of DUPU message, the DUPU message will be transferred to the signaling point, therefore realizing transparent transmission of DUPU message in IP signaling network.

2. If there is no Concerned DPC in DUPU message, the DUPU message will be broadcasted to the adjacent signaling point directly, therefore realizing transferring DUPU message through STP.

In various embodiments, a message compatible with DUPU message and including at least Affected Point Code can be adopted, which may include a parameter containing the information of the destination signaling point to be notified, the same object of the invention can be achieved. One various implementation may be found as described above.

The above description includes only various exemplary embodiments, which shall not be regarded as limitations. Any modifications, equivalent alternatives and improvements within the spirit and principle of the teachings should be included in the scope of the teachings.

What is claimed is:

1. A method for transmitting a Destination User Part Unavailable (DUPU) message, comprising:

signaling-message-transmitting, by an Application Server Process, a received DUPU message, if the Application Server Process is a signaling transfer point, wherein, the received DUPU message comprises information of a destination signaling point to be notified;

the Application Server Process transmits the received DUPU message to a signaling point indicated by the information of the destination signaling point to be notified, upon receiving the DUPU message and determining that the information of the destination signaling point to be notified is contained in the received DUPU message;

wherein the Application Server Process and the received DUPU message are implemented in accordance with the MTP Level 3 User Adaptation (M3UA) layer.

2. The method according to claim 1, wherein the signaling-message-transmitting comprises:

broadcasting, by the Application Server Process, the received DUPU message to an adjacent signaling point.

3. The method according to claim 1, wherein the information of the destination signaling point to be notified is contained in INFO parameter of the received DUPU message.

4. The method according to claim 1, comprising setting a message compatible with the received DUPU message, wherein the message comprises the information of the destination signaling point to be notified.

5. The method according to claim 4, comprising configuring parameter information in the message, wherein the parameter information comprises the information of the destination signaling point to be notified.

* * * * *

UNITED STATES PATENT AND TRADEMARK OFFICE
CERTIFICATE OF CORRECTION

PATENT NO. : 7,882,242 B2
APPLICATION NO. : 12/110683
DATED : February 1, 2011
INVENTOR(S) : Guohuo Chen Page 1 of 1

It is certified that error appears in the above-identified patent and that said Letters Patent is hereby corrected as shown below:

In the Title Page, Item (56), References Cited, Other Publications, 3$^{rd}$ Reference:

"XP015028972" should be --XP015038972--.

Signed and Sealed this
Twenty-second Day of March, 2011

David J. Kappos
*Director of the United States Patent and Trademark Office*